(12) United States Patent
Pepin et al.

(10) Patent No.: US 7,698,685 B2
(45) Date of Patent: Apr. 13, 2010

(54) DISCOVERY, QUALIFICATION, AND ACTIVATION OF SOFTWARE ADD-IN COMPONENTS

(75) Inventors: Brian Pepin, Seattle, WA (US); James Slocum Miller, Bellevue, WA (US); Thomas Edward Quinn, Jr., Seattle, WA (US); Jeffrey Marc Richter, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1218 days.

(21) Appl. No.: 11/248,051

(22) Filed: Oct. 12, 2005

(65) Prior Publication Data

US 2007/0083512 A1      Apr. 12, 2007

(51) Int. Cl.
G06F 9/44         (2006.01)
(52) U.S. Cl. .................. 717/120; 717/174; 719/320; 719/331
(58) Field of Classification Search .................. None
See application file for complete search history.

(56) References Cited

U.S. PATENT DOCUMENTS

| | | | | |
|---|---|---|---|---|
| 6,006,279 | A * | 12/1999 | Hayes | ............ 719/328 |
| 6,055,562 | A | 4/2000 | Devarakonda et al. | |
| 6,085,030 | A | 7/2000 | Whitehead et al. | |
| 6,223,346 | B1 | 4/2001 | Tock | |
| 6,347,398 | B1 | 2/2002 | Parthasarathy et al. | ........ 717/11 |
| 6,523,166 | B1 | 2/2003 | Mishra et al. | |
| 6,549,932 | B1 | 4/2003 | McNally et al. | |
| 6,778,990 | B2 | 8/2004 | Garcia et al. | |
| 6,795,853 | B1 | 9/2004 | Snover | ............ 709/220 |
| 6,834,303 | B1 | 12/2004 | Garg et al. | |
| 6,892,230 | B1 | 5/2005 | Gu et al. | |
| 6,901,440 | B1 | 5/2005 | Bimm et al. | |

(Continued)

FOREIGN PATENT DOCUMENTS

WO      WO 01/48603      4/2001

(Continued)

OTHER PUBLICATIONS

Nanditha N. Siram, Rajeev R. Raje, Andrew M. Olson, Barrett R. Bryant, Carol C. Burt, Mikhail Auguston "An Architecture for the UniFrame Resource Discovery Service", 17 pages http://www.cs.iupui.edu/uniFrame/pubs-openaccess/SEM2002.pdf.

(Continued)

Primary Examiner—Michael J Yigdall
(74) Attorney, Agent, or Firm—Workman Nydegger

(57) ABSTRACT

The present invention extends to methods, systems, and computer program products for discovering, qualifying, and activating software add-in components. An add-in components manager discovers one or more add-in components at the computer system are of a specified type of add-in component requested by an application. The add-in component manager qualifies at least one discovered add-in component based on the at least one discovered add-in component satisfying one or more qualification constraints. The one or more qualification constraints are representative of functionality that is to be associated with an add-in component for the add-in component to interoperate with the application in a desired manner. The add-in component manager activates a qualified add-in component in accordance with the one or more qualification constraints for use with the application.

15 Claims, 4 Drawing Sheets

U.S. PATENT DOCUMENTS

| | | | |
|---|---|---|---|
| 6,996,832 B2 * | 2/2006 | Gunduc et al. | 719/331 |
| 7,254,814 B1 * | 8/2007 | Cormier et al. | 718/106 |
| 2003/0110315 A1 | 6/2003 | Upton | 709/328 |
| 2003/0172127 A1 | 9/2003 | Northrup et al. | |
| 2004/0181471 A1 | 9/2004 | Rogers | |
| 2005/0039061 A1 | 2/2005 | Schultz | |
| 2006/0037000 A1 | 2/2006 | Speeter et al. | |

FOREIGN PATENT DOCUMENTS

| | | |
|---|---|---|
| WO | 02/48878 | 6/2002 |

OTHER PUBLICATIONS

Andreas Frei, Andrei Popovici, Gustavo Alonso "Eventizing Applications in an Adaptive Middleware Platform", pp. 1-15 IEEE Distributed Systems Online 1541-4922 © 2005 Published by the IEEE Computer Society, vol. 6, No. 4; Apr. 2005 http://ieeexplore.ieee.org/ie15/8968/30778/01425404.pdf?arnumber=1425404.

Karl Pauls and Richard S. Hall "Eureka—A Resource Discovery Service for Component Deployment", pp. 1-2 Lecture Notes in Computer Science Springer-Verlag GmbH vol. 3083/ 2004 http://www.springerlink.com/(omntx4rvjzsjxb55np5nltmv)/app/home/contribution.asp?referrer=parent
&backto=issue,11,16;journal,773,3295;linkingpublicationresults,1:105633,1.

SIP Center "Pannamway Technologies Releases Client Server-based Broadband Access Manager (BAM)", pp. 1-3 Sep. 12, 2005 http://www.sipcenter.com/sip.nsf/newsview?open&type=News&docid=WIUJ.

* cited by examiner

DISCOVERY, QUALIFICATION, AND ACTIVATION OF SOFTWARE ADD-IN COMPONENTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and and/or other electronic devices via wired and/or wireless computer networks.

Software applications (e.g., word processors, electronic mail clients, etc.) are often designed in a modular fashion such that different software components of an application interoperate to provide a desired function. As such, modules of an application may be assembled by an end-user at run-time and are often provided by different vendors at different times. This modularity allows an application's feature set to change dynamically and promotes efficient distributed development of larger applications.

For example, different teams of developers can work on various modules of an application in isolation, and combine the modules at a later time. During development, the different modules can be designed to interoperate with one another at runtime. Often, members of a software development team are aware of one another, and may all be employees of the same company (e.g., that are specifically assigned to develop a specified application). On the other hand, different teams of developers may be given software specifications to provide certain modules and the different teams are not aware of one another.

Application development can include developing interfaces for interoperation with other (and potentially subsequently developed) modules (e.g., add-ins) that provide additional and/or different functionality not originally designed into the application. For example, a Web browser typically includes the functionality to load plug-ins, for example, to facilitate proper processing of formatted content (e.g., flash animation, portable document format documents, etc.) that could not otherwise be processed. Although potentially developed by developers of a target application, plug-ins and add-ins are often developed by third party developers. That is, developers of an add-in are often not the developers of the application the add-in is designed to operate with.

As a result, applications and corresponding add-ins are often installed (or stored) onto a computer system at different times. To load an add-in, an application calls the appropriate interface with the name of the add-in. However, for an application to load an add-in, the application typically must know the location (e.g., in a file system) and name of the add-in. As such, the path of an add-in directory is typically hard-coded into an application. For the application to utilize an add-in, the add-in must be stored in the appropriate add-ins directory.

Since each application can have a hard-coded path for a different add-in directory, there may be a number of add-in directories on a computer system. Some add-ins may be designed to provide similar functionality (e.g., a dictionary) to a number of different applications (e.g., word processor, electronic mail client, spread sheet application, etc.). However, to provide the similar function to a number of different applications, a separate copy of the add-in must be stored in the add-ins location for each of the applications. As a result, an add-in may be redundantly stored in a number of locations at a computer system. In some environments, an add-in with desired functionality may be stored at a computer system but is unknown and/or inaccessible to an application because the add-in is stored in the add-ins directory for a different application.

Development of add-ins typically requires that an add-in developer know the interfaces used by an application to load add-ins. Thus, if an add-in developer desires to provide similar add-in functionality to a number of different applications, the add-in developer must develop the add-in with an appropriate interface for each of the different applications. Further, if an application update changes an application interface, the add-in may also need to be updated for compatibility. Thus an add-in developer may need to frequently release new versions of the add-in for compatibility, even when no new functionality is included in the add-in.

As previously described, accessing the functionality of an add-in typically includes loading an add-in by name from an application specific add-in directory. However, before loading an add-in, an application has little, if any, assurance that the add-in will operate as intended and that the add-in is secure. Typically, the only mechanism that can be used to determine how an add-in will operate is to load the add-in and test it at run-time. Thus, an application may be forced to load and run an inappropriately configured add-in to determine that the add-in is inappropriately configured. An application's use of an inappropriately configured add-in can cause a computer system to malfunction.

Use of add-ins also poses a security risk, since malicious code in an add-in may be able to gain access to otherwise protected system functions by interfacing with an application. However, an application may have limited, if any, mechanisms for determining that the add-in includes malicious code without loading and running the add-in. One solution is to prevent applications from utilizing any add-ins. However, this solution prevents an application from using appropriately configured add-ins that enhance application functionality.

BRIEF SUMMARY

The present invention extends to methods, systems, and computer program products for discovering, qualifying, and activating software add-in components. In some embodiments, a computer system discovers an add-in is available to an application. An add-in component manager receives a request for available add-in components from an application. The request including a selectable add-in component property indicative of a specified type of add-in component the application is requesting.

The add-in component manager compares the selectable add-in component property to the contents of an add-in component entry for an add-in component. The add-in component entry is included in an add-in component index that also includes add-in component entries for other add-in components of the computer system. The add-in component entry includes one or more properties indicative of the functionality of an add-in component identified during a registration process with the add-in component manager. The add-in component manager determines that the add-in component is of the specified type requested by the application based on the results of the comparison. The add-in component manager indicates to the application that the add-in component is an add-in component of the specified type that is available to the application.

In other embodiments, a computer system determines if an add-in component available to an application is qualified for use with the application. An add-in component manager accesses one or more identified properties for a candidate add-in component that is available to an application. The one or more identified properties indicate functionality associated with the candidate add-in component. The add-in component represented in an add-in component entry in an add-in component index that also includes add-in component entries for other add-in components of the computer system.

The component manager receives a request from the application for add-in components that satisfy one or more qualification constraints. Each qualification constraint represents functionality that is to be associated with an add-in component for the add-in component to appropriately operate with the application. The component manager compares the one or more qualification constraints and the one or more identified properties. The component manager determines if the candidate add-in component is qualified for use with the application based on the results of comparing the one or more qualification constraints to the one or more identified properties.

In further embodiments, a computer system loads an add-in component for use with an application based on requested add-in component functionality. An add-in component manager discovers one or more add-in components at the computer system are of a specified type of add-in component requested by an application. The add-in component manager qualifies at least one discovered add-in component based on the at least one discovered add-in component satisfying one or more qualification constraints. The one or more qualification constraints representative of functionality that is to be associated with an add-in component for the add-in component to interoperate with the application in a desired manner. The add-in component manager activates a qualified add-in component in accordance with the one or more qualification constraints for use with the application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
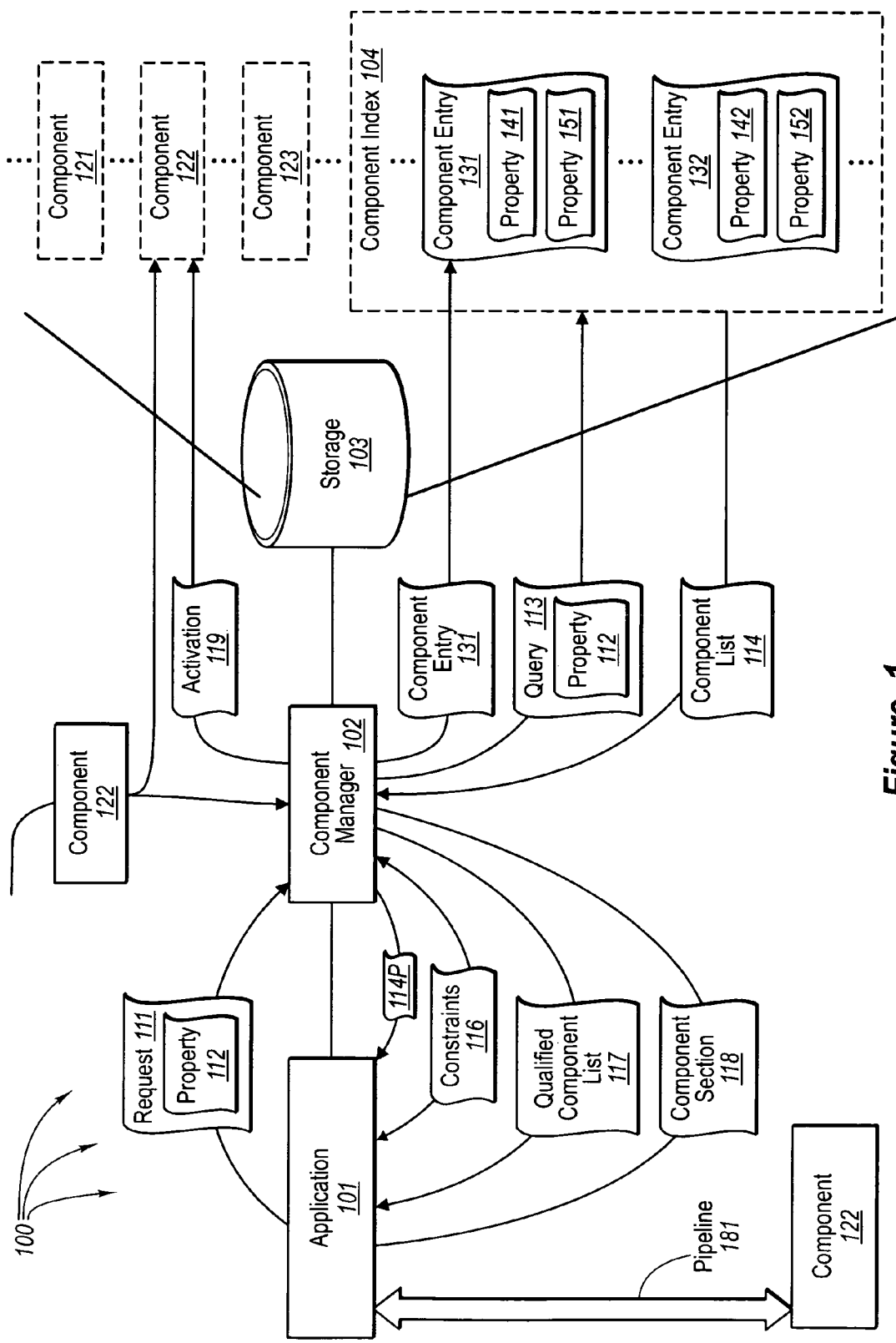
FIG. 1 illustrates a computer architecture that facilitates discovery, qualification, and activation of software add-in components.

The present invention extends to methods, systems, and computer program products for discovering, qualifying, and activating software add-in components. In some embodiments, a computer system discovers an add-in is available to an application. An add-in component manager receives a request for available add-in components from an application. The request including a selectable add-in component property indicative of a specified type of add-in component the application is requesting.

The add-in component manager compares the selectable add-in component property to the contents of an add-in component entry for an add-in component. The add-in component entry is included in an add-in component index that also includes add-in component entries for other add-in components of the computer system. The add-in component entry includes one or more properties indicative of the functionality of an add-in component identified during a registration process with the add-in component manager. The add-in component manager determines that the add-in component is of the specified type requested by the application based on the results of the comparison. The add-in component manager indicates to the application that the add-in component is an add-in component of the specified type that is available to the application.

In other embodiments, a computer system determines if an add-in component available to an application is qualified for use with the application. An add-in component manager accesses one or more identified properties for a candidate add-in component that is available to an application. The one or more identified properties indicate functionality associated with the candidate add-in component. The add-in component represented in an add-in component entry in an add-in component index that also includes add-in component entries for other add-in components of the computer system.

The component manager receives a request from the application for add-in components that satisfy one or more qualification constraints. Each qualification constraint represents functionality that is to be associated with an add-in component for the add-in component to appropriately operate with the application. The component manager compares the one or more qualification constraints and the one or more identified properties. The component manager determines if the candidate add-in component is qualified for use with the application based on the results of comparing the one or more qualification constraints to the one or more identified properties.

In further embodiments, a computer system loads add-in component for use with an application based on requested add-in component functionality. An add-in component manager discovers one or more add-in components at the computer system are of a specified type of add-in component requested by an application. The add-in component manager qualifies at least one discovered add-in component based on the at least one discovered add-in component satisfying one or more qualification constraints. The one or more qualification constraints representative of functionality that is to be associated with an add-in component for the add-in component to interoperate with the application in a desired manner. The add-in component manager activates a qualified add-in component in accordance with the one or more qualification constraints for use with the application.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 facilitates discovery, qualification, and activation of software add-in components. Depicted in computer architecture 100 are components of a computer system. The computer system can be connected to a network, such as, for example, a Local Area Network ("LAN"), a Wide Area Network ("WAN"), or even the Internet. Thus, the computer system and other network connect computer systems can receive data from and send data to other computer systems connected to a network. Accordingly, the computer, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computer system architecture 100 includes application 101, component manager 102, and storage 103. Within computer architecture 100, items residing in (or interacting with) system memory are surrounded by a solid line. For example, application 101 and component manager 102 are loaded in system memory. On the other hand, items residing in storage 103 are surrounded by a dashed line. For example, components 121, 122, and 123 and component entries of component index 104 reside in storage 103. At different times, the same item can reside in system memory and/or in storage 103. For example, component 122 can be activated causing portions of component 122 to load from storage 103 into system memory (yet still also residing in storage 103).

Generally, application 101 is an application configured to utilize software add-in components to enhance functionality. For example, application 101 may be a word processing application capable of loading external dictionaries or a Web browser capable of loading plug-ins for particular types of content. Application 101 can have a program interface for interoperating with software add-in components. Application 101 can also include a user-interface allowing a user of application 101 to specify types of software add-in components and constraints that software add-in components are to comply with for interoperation with application 101.

Component manager 102 is generally configured to provide available software add-in components to applications. Component manager 102 can be included in an operating system and/or can be a portion of middleware that manages software add-in components for applications. Component manager 102 includes the functionality to receive application requests for software add-in components, identify software add-in components that satisfy the requests, and return identified software add-in components back to the application.

Also, as part of a registration process, when a software add-in component is installed onto computer architecture 100, component manager 102 can access the software add-in component. For example, component manager 102 can access component 122. Component manager 102 can analyze an accessed software add-in component (e.g., based on installation information) to identify a location, such as, for example, file path and name, where component 122 is to be stored at storage 103.

Component manager 102 can also analyze an accessed software add-in component to identify (e.g., through reflection) the type of the software add-in component and operational capabilities of the software add-in component. For example, component manager 102 can analyze attributes on component 122 to identify the type and operational capabilities of component 122. Software add-in component types can include, for example, a dictionary, a content processor, etc. Software add-in component operational capabilities can include an entry point for a software add-in component, isolation boundaries needed or supported by a software add-in component, and security settings associated with a software add-in component.

Component manager 102 can construct a component entry including one or more properties indicative of the identified functionality (i.e., type and operational capabilities) of a software add-in component. For example, component manager 102 can construct component entry 131 for component 122 including at least properties 141 and 151. Properties in a component entry can indicate the type of a software add-in component, such as, for example, a dictionary, a content processor, etc. Properties in a component entry can also indicate a location (e.g., in a file system) where a software add-in component is stored.

Properties in a component entry can also indicate a contract (or entry point protocol) used to implement the interface for the software add-in component. A property representing an entry point can be included in an eXtensible Markup Language ("XML") manifest that adheres to a specified manifest schema and that defines the assembly or assemblies that included in the software add-in component. Component manager 102 can analyze a software add-in component to identify an entry point and represent this in a property in a component entry. An entry point can be an instantiable class in an assembly. The class can implement standard protocols used by a host application for initial hookup and control of the software add-in component. The following code example represents an entry point protocol:

Public interface IEntryPoint Protocol:IProtocol

```
{
  void Startup(IProtocol hostObject);
  void Shutdown( );
}
```

Properties can also indicate a location (or isolation boundary) for running the software add-in component. A location can indicate if a software add-in component is compatible with running in process or out of process with the requesting application or in the same or a different application domain as the requesting application. Supported or needed isolation boundaries can include local application domains, shared application domains, private application domains, and other processes.

Properties can also indicate security settings associated with the software add-in component. For example, properties can indicate a set of permissions for running a software add-in component.

Component manager 102 can store constructed component entries for software add-in components in component index 104. Component index 104 can be virtually any data repository, such as, for example, a system registry, a shared SQL server, an XML file, an Active Directory server, the Internet, or a file system directory.

Subsequent to or in parallel with component manager 102's analysis of a software add-in component, the software add-in component can be stored in storage 103. For example, component 122 can be stored along with components 121 and 123 (as well as other software add-in components represented by vertical ellipses) at storage 103. Thus, each software add-in component in storage 103 can have a corresponding component entry (with one or more properties indicative of functionality) in component index 104. For example, component entry 131 can correspond to component 122, component entry 132 can correspond to component 121, etc.

Component manager 102 can sort component index 104 by criteria known to component manager 102, such as, for example, the developer of the add-in, the developer of the application, etc. By sorting the index, retrieval using these criteria, such as, for example, during discovery, is made more efficient.

As previously described, properties in a component entry are indicative of the functionality of a corresponding software add-in component. Thus, properties 141 and 151 can indicate functionality of component 122 and properties 142 and 152 can indicate functionality of component 121. Component 123 as well as other components at storage 103 can also have corresponding component entries in component index 104 containing one or more indicative properties. Although component entries 131 and 132 each depict two properties, virtually any number of properties can be included in a component entry based at least in part on component manager 102's analysis of a corresponding software add-in component.

Figure 2:
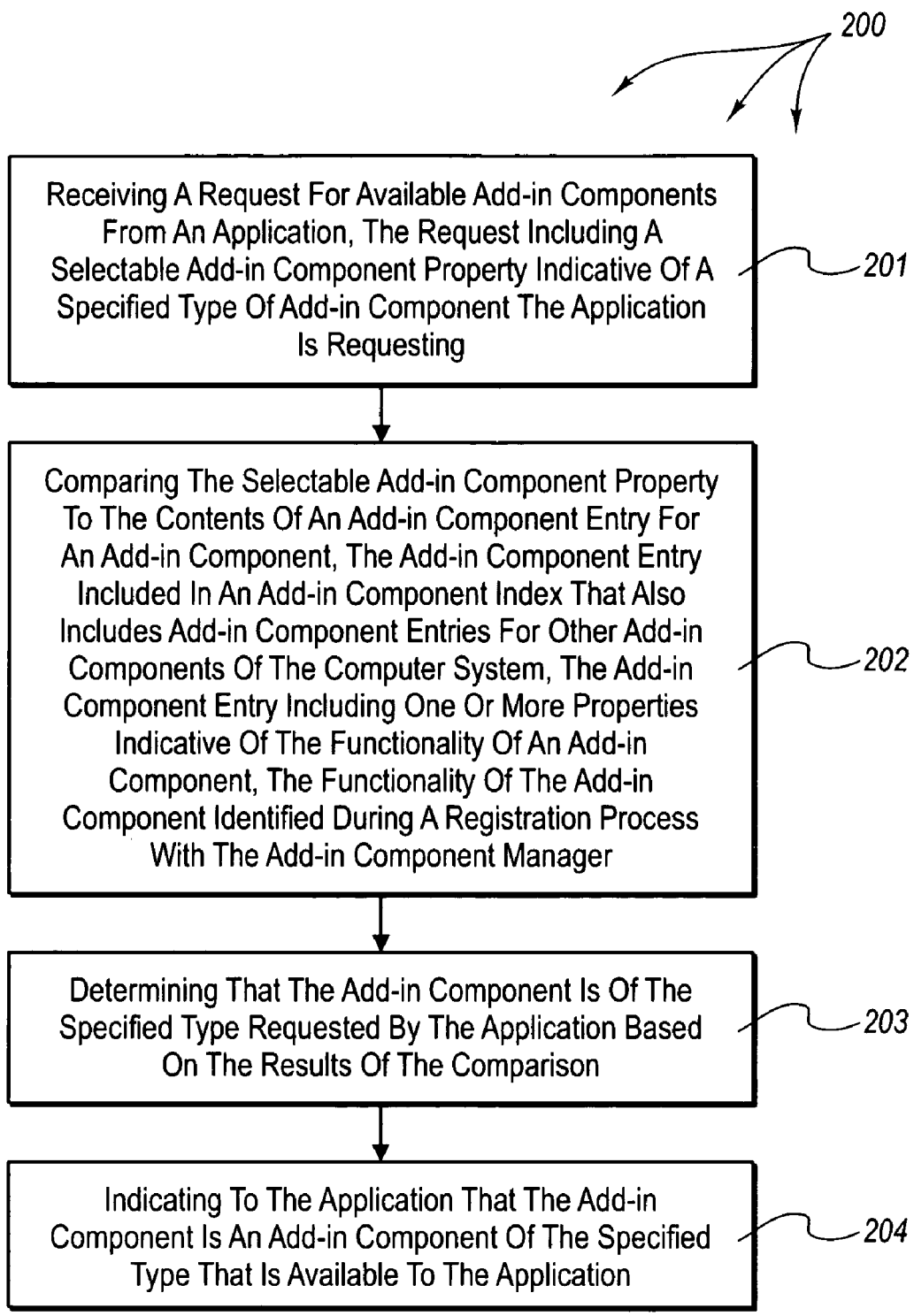
FIG. 2 illustrates a flow chart of a method for discovering an add-in component that is available to an application.

FIG. 2 illustrates a flow chart of a method 200 for discovering an add-in component that is available to an application. Method 200 will be described with respect to the components and data in computer system architecture 100.

Method 200 includes an act of receiving a request for available add-in components from an application (act 201). The request including a selectable add-in component property indicative of a specified type of add-in component the application is requesting. For example, component manager 102 can receive request 111, including property 112, from application 101. Property 112 can indicate a specified type of software add-in component being requested by application 101. In some embodiments, property 112 is pre-configured into application 101. In other alternate embodiments, application 101 receives a user-selection of property 112 (or some other selectable property).

Method 200 includes an act of comparing the selectable add-in component property to the contents of an add-in component entry for an add-in component (act 202). The add-in component entry included in an add-in component index that also includes add-in component entries for other add-in components of a computer system. The add-in component entry including one or more properties indicative of the functionality of an add-in component identified during a registration process with the add-in component manager. For example, component manager 102 can issue query 113 against component entries in component index 104. Thus, it may be that property 112 is compared against properties 141 and 151 (indicative of the functionality of component 122) in component entry 131.

Method 200 includes an act of determining that the add-in component is of the specified type requested by the application based on the results of the comparison (act 203). For example, component manager 102 can determine that component 122 is a type of software add-in component requested by application 101 based on the results of comparing property 112 to property 141 (or some other property in component entry 131). It may be that component manager 102 also determines that one or more other components are also components of the specified type. Component manager 102 can compile a list, for example, component list 114, that identifies any components of the specified type. Component list 114 can also include other properties (in addition to type), such as, for example, properties indicating operational capabilities of a software add-in component, from a component entry.

Method 200 includes an act of indicating to the application that the add-in component is an add-in component of the specified type that is available to the application (act 204). For example, component manager 102 can indicate to application 101 that component 122 is a component of the type indicated by property 112. When a list of components of a specified type of is compiled, for example, component list 114, component manager can send at least a portion of list to application 101. For example, component manager 102 can send partial list 114P to application 101.

Partial list 114P can include properties that identify each software add-in component of the specified type. Component manager 102 may retain other properties indicative of software add-in component operational capabilities without sending them to application 101. Alternately, component manager 102 may send properties indicative of software add-in component operational capabilities to application 101. Accordingly, application 101 can be made aware of any available software add-in components of a requested specified type (and potentially other functionality of the software add-in components).

Method 200 can be repeated for each entry in an add-in component index (e.g., each entry in component index 104) to potentially identify other add-ins of the specified type (e.g., components 121 and 123). Thus, a number of add-ins of a specified type (i.e., a subset of all registered add-ins) can be discovered. Accordingly, add-in components can be identified (discovered) based on information provided to an add-in manager (e.g., component manager 102) when the add-in is registered. Method 200 can be used to make a coarse grain selection on add-in components that are potentially useable by an application to implement specified functionality.

Figure 3:
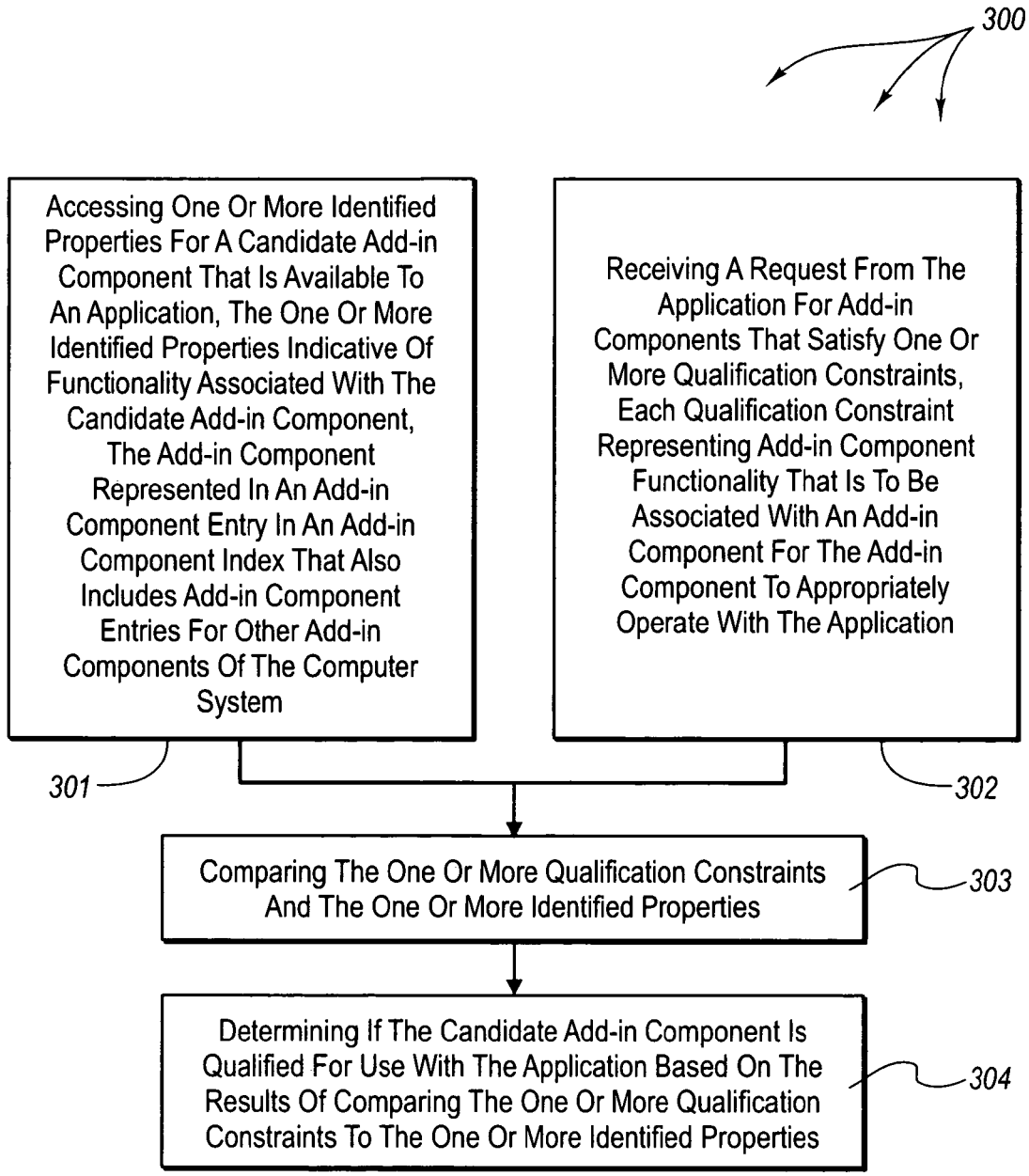
FIG. 3 illustrates a flow chart of a method for determining if an add-in component available to an application is qualified for use with the application.

FIG. 3 illustrates a flow chart of a method 300 for determining if an add-in component available to an application is qualified for use with the application. Method 300 will be described with respect to the components and data in computer system architecture 100.

Method 300 includes an act of accessing one or more identified properties for a candidate add-in component that is available to an application (act 301). The one or more identified properties indicate functionality that is associated with the candidate add-in component. The add-in component represented in an add-in component entry in an add-in component index that also includes add-in component entries for other add-in components of the computer system. For example, component manager 102 can access properties 141 and 151 (indicative of the functionality of component 122) from component entry 131. Alternately, component manager 102 can access properties 141 and 151 from component list 114 that was previously compiled in response to discovering software add-in components of a specified type.

In other embodiments, component manager 102 accesses other information associated with component 122 that is not stored in component entry index 104. Other associated information can be accessed separately and/or in combination with information that is included in component index 104. Other associated information may or may not be accessible or available to component 122 and may or may not have been provided to component manager 102 during a registration process. Further, component manager 102 may choose to discard or ignore information received from components during a registration process. Thus, even if component 122 provides associated information to component manager 102, the associated information may not be included in component entry 131 (and may not be in component index 104 at all).

Method 300 includes an act of receiving a request from the application for add-in components that satisfy one or more qualification constraints (act 302). Each qualification constraint representing functionality that is to be associated with an add-in component for the add-in component to appropriately operate with the application. For example, component manager 102 can receive constraints 116 from application 101. Constraints 116 can represent add-in component functionality that is to be associated with a software add-in component for the software add-in component to appropriately operate with application 101. For example, constraints 116 can indicate that a software add-in component is to utilize a specified entry point protocol, run in a private application domain, etc., when operating with application 101.

In some embodiments, an add-in component registers one or more constraints in a component index that specify a corresponding one or more properties an application is to satisfy before the application can interoperate with the add-in component. Thus it may be that component 122 registers one or more constraints indicating properties application 101 is to satisfy for interoperation with component 122. Component manager 102 can send constraints for an add-in component to an application. For example, component manager can send constraints 116 (e.g., for component 122) to application 101.

Add-in component constraints can be used to check application for behavior or to request that an application alter its behavior for interoperation with an add-in component. For example, application 101 may default to running all add-in components in the same application domain. However, component 122 may constrain application 101 to running component 122 in a separate application domain (e.g., used only by component 122). Thus, in some embodiments a qualification process can be viewed as a negotiation between an application and an add-in component. That is, an add-in component may need to satisfy constraints of an application and the application may need to satisfy constraints of the add-in component for appropriate interoperation between the application and the add-in component. The bi-directional arrow depicted for constraints 116 represents a negotiation.

Method 300 includes an act of comparing the one or more qualification constraints and the one or more identified properties (act 303). For example, component manager 102 can compare constraints 116 to properties 141 and 151. Method 300 includes an act of determining if the candidate add-in component is qualified for use with the application based on the results of comparing the one or more qualification constraints to the one or more identified properties (act 304). For example, component manager 102 can determine if component 122 is qualified for use with application 101 based on the results of comparing constraints 116 with properties 141 and 151.

That is, component manager 102 can determine that operational capabilities indicated by constraints 116 are operational capabilities that can be implemented by component 122 (as indicated properties 141 and 151). For example, if a constraint indicates that a software add-in component is to run in a private application domain and a property of a software add-in component indicates that it is capable of running in a private application domain, the software add-in component satisfies the constraint. On the other hand, if a constraint indicates that a software add-in component is to implement a specified entry point protocol but a property of a software add-in component indicates that it is not capable of implementing the specified entry point protocol, the software add-in component does not satisfy the constraint.

Method 300 can be repeated for a number of (previously discovered) add-in components to create a list of potential add-in components that are qualified for use with an application. Thus, a number of add-ins satisfying qualification constraints can be qualified for use with an application. As previously described, add-in components can be qualified based on information provided to an add-in manager (e.g., component manager 102) when the add-in is registered as well as other information not provided or retained by the add-in manager. Method 300 can be used to make a fine grain selection on (previously discovered) add-in components that are potentially useable by an application.

It should be understood that the description of constraints, properties, comparisons, and satisfying constraints are merely examples. It would be apparent to one skilled in the art, after having reviewed this description, that embodiments of the invention can utilize other constraints, properties, and comparisons and that constraints can be satisfied in other ways, in addition to those expressly described.

In some embodiments, method 200 and method 300 are used in combination to provide a list of add-in components indicating that the add-in components and an application are qualified to interoperate with one another to implement specified functionality. A coarse grain discovery process can be used to discover a subset of available component add-ins by comparing one or more received properties to properties in component index entries. When a component index is sorted, the discovery process can efficiently provide a subset of available add-in components satisfying the one or more received properties. From the subset of discovered add-in components, a fine grain qualification process can qualify one or more add-in components and the application for interoperability. Qualification can be based on information in the component index and/or other information associated with an add-in components or the application. Qualification can be bi-directional (a negotiation). That is, add-in components may need to satisfy application constraints and the application may need to satisfy add-in component constraints.

Qualified software add-in components can be included in a list, for example, qualified component list 117, and sent to application 101. In some embodiments, application 101 is pre-configured with selection logic to select an appropriate software add-in component from a list of qualified components. In other embodiments, application 101 can present a user-interface allowing a user to select an appropriate software add-in component from a list of qualified components.

Application 101 can return a component selection, for example, component selection 118, back to component manager 102. In response, component manager 102 can activate the selected software add-in component. For example, component manager 102 can send activation 119 to a file system to activate component 122. Activation 119 can include an identifier, such as, for example, a directory path and name, for locating component 122 in storage 103. Activation 119 can include commands to activate component 122 in accordance with constraints 116. For example, if application 101 requested a shared application domain, component 122 can be activated in a shared application domain with application 101. Activation 119 can cause component 122 to be loaded into memory and a communication path to be established between application 101 and component 122 in accordance with constraints 116.

One type of communication path that can be established in accordance with satisfied constraints is a pipeline, such as, for example, pipeline 181. A pipeline can include one or more node application programming interfaces (hereafter "APIs"), one or more adapters, and at least one pipeline protocol. Such pipelines may include APIs, adapters, and pipeline protocols in varying quantities and combinations, and need not necessarily include all of the pipeline elements. APIs refer to a set of routines used by an application, program, function, and other assemblage of programmable and executable code to direct the performance of procedures therefore by a corresponding execution environment, such as an operating system or runtime execution environment. Adapters refer to modules or objects that are capable of communicatively adapting one API to another API, and may be linked serially or via a pipeline protocol. Pipeline protocol refers to a specification or contract through which objects, of which an API is a non-exclusive example, may communicate.

Thus, a pipeline (e.g., pipeline 181) can be a chain of code modules or objects that flow from a host API adapter to an add-in API adapter, via a pipeline protocol, to connect a first node application (e.g., application 101) to a second node application (e.g., component 122). However, it should be understood other types of communication paths can also be established in accordance with satisfied constraints. Thus, it would be apparent to one skilled in the art, after having reviewed this description, that embodiments of the invention can utilize other types of communication paths, in addition to pipelines.

In alternate embodiments, application 101 can include constraints 116 along with property 112 in request 111. In these alternate embodiments, component manager 102 can query component index 104 for software add-in components of a type indicated in property 112 and that satisfy constraints 116. Software add-in components satisfying the query can be returned to application 101 in qualified component list 117.

Figure 4:
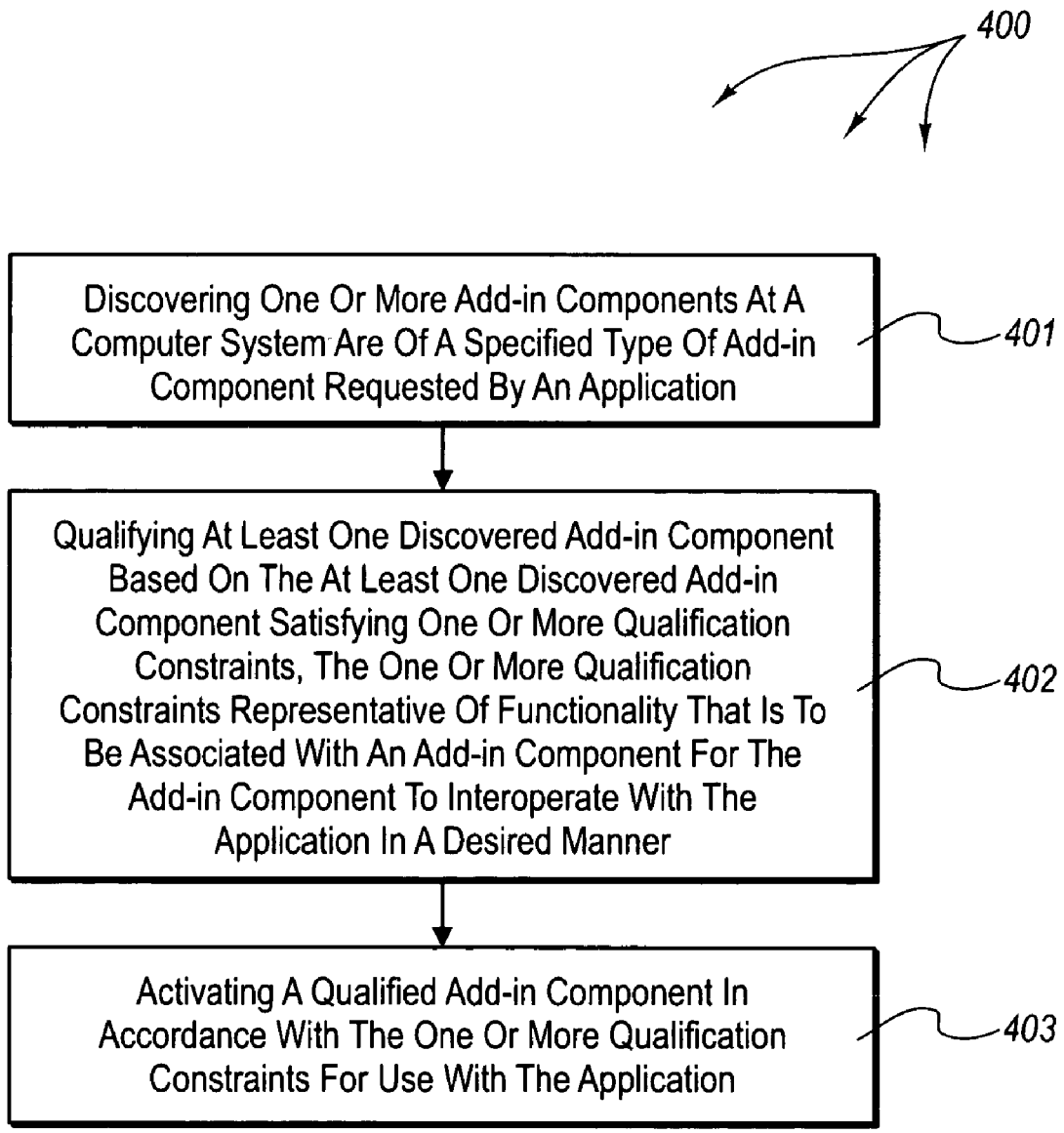
FIG. 4 illustrates a flow chart of a method for loading an add-in component for use with an application based on requested add-in component functionality.

FIG. 4 illustrates a flow chart of a method 400 for loading an add-in component for use with an application based on requested add-in component functionality. Method 400 will be described with respect to the components and data in computer system architecture 100.

Method 400 includes an act of discovering one or more add-in components at the computer system are of a specified type of add-in component requested by an application (act 401). For example, through comparison to properties in component entries, component module 102 can discover that one or more of components 121, 122, and 123 are of a specified type (e.g., a dictionary, a content processor, etc) indicated by property 112.

Method 400 includes an act of qualifying at least one discovered add-in component based on the at least one discovered add-in component satisfying one or more qualification constraints (act 402). The one or more qualification constraints representative of functionality that is to be associated with an add-in component for the add-in component to interoperate with the application in a desired manner. For example, component manager 102 can qualify any of components 121, 122, and 123, which satisfy constraints 116. Satisfying constraints 116 (e.g., through comparison to properties in component entries) represents that a component includes functionality to interoperate with the application 101 in a desired manner (e.g., has appropriate permissions, has a compatible entry point protocol, can run in an appropriate application domain, etc.)

Method 400 includes an act of activating a qualified add-in component in accordance with the one or more qualification constraints for use with the application (act 403). For example, component manager 102 can activate component 122 for use with application 101 in accordance with constraints 116.

Embodiments of the present invention facilitate dynamic and flexible software add-in component selection without applications having to include the logic for making such selections. Software add-in components can be discovered by type even when software add-in components are stored in various different locations. Software add-in components can be qualified for appropriate functionality before being loaded for use with an application. Qualifying software add-in components reduces the likelihood of loading inappropriately configured or malicious software add-in components. Accordingly, embodiments of the present invention promote efficient and secure use of software add-in components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for use at a computer system including an application, an add-in component manager, and one or more add-ins, the computer program product for implementing a method for loading an add-in for the application that has been registered for use by the add-in component manager to provide a specified implementation of intended functionality, the computer program product comprising one or more computer storage media having stored thereon computer-executable instructions that, when executed by a processor, cause the computer system to perform the following:

receive a request from the application for an add-in component that satisfies one or more qualification constraints, the combination of the one or more qualification constraints representing that the application desires the add-in to provide the specified implementation of the intended functionality to the application;

query a component index for any entries having properties that satisfy the one or more qualification constraints, each entry in the component index corresponding to an add-in that was previously analyzed and registered by the add-in component as qualified to provide an implementation of some intended functionality, each entry including one or more properties indicating an implementation of the intended functionality of the add-in as determined from the analysis of the add-in, for each add-in, the previous analysis and registration including:

identifying the operational capabilities of the add-in, the operational capabilities including one or more of isolation boundaries needed or supported by the add-in and security settings corresponding to the add-in; and inserting one or more properties representing the operational capabilities of the add-in into the entry for the add-in in the component index, the one or more properties including indicating one or more of isolation boundaries needed or supported by the add-in and security settings corresponding to the add-in determined by the analysis;

receive one or more entries from the component index having properties that satisfy the one or more qualification constraints, each of the one or more entries identifying a candidate add-in that can provide the specified implementation of the intended functionality to the application;

send a component list including the one or entries to the application;

receive a selection of an entry included in the component list from the application; and request activation of the add-in corresponding to the selected entry so that the application can use the specified implementation of the intended functionality provided by the add-in.

2. The computer program product as recited in claim 1, wherein identifying the operational capabilities of the add-in comprises identifying an entry point protocol for the add-in.

3. The computer program product as recited in claim 1, wherein identifying the operational capabilities of the add-in comprises identifying the permissions associated with the add-in.

4. The computer program product as recited in claim 1, wherein identifying the operational capabilities of the add-in comprises identifying an application domain the add-in can run in.

5. The computer program product as recited in claim 1, further comprising computer-executable instructions that, when executed, cause the computer system to perform the following:

in response to the request to activate the add-in, receive a request from the add-in that the application satisfy one or more other qualification constraints, each other qualification constraint representing functionality that is to be associated with the application for the application to appropriately operate with the add-in component;

compare the one or more other qualification constraints to properties of the application; and determine if the application is qualified for use with the candidate add-in component based on the results of comparing the one or more other qualification constraints to the properties of the application.

6. The computer product as recited in claim 1, further comprising computer-executable instructions that, when executed, cause the computer system to perform the following:

sort add-in component entries of the component index based on a subset of add-in component properties used for add-in discovery.

7. The computer program product as recited in claim 6, wherein the add-in component index is stored in a data repository selected from among a system registry, a shared SQL server, an XML file, an Active Directory server, the Internet and a file system directory.

8. At a computer system including a processor, system memory, an application, an add-in component manager, and one or more add-ins, a method for loading an add-in for the application, wherein the add-in has been registered for use by the add-in component manager to provide a specified implementation of intended functionality, the method comprising:

an act of receiving a request from the application for an add-in component that satisfies one or more qualification constraints, the combination of the one or more qualification constraints representing that the application desires the add-in to provide the specified implementation of the intended functionality to the application;

an act of the processor querying a component index for any entries having properties that satisfy the one or more qualification constraints, each entry in the component index corresponding to an add-in that was previously analyzed and registered by the add-in component as qualified to provide an implementation of some intended functionality, each entry including one or more properties indicating an implementation of the intended functionality of the add-in as determined from the analysis of the add-in, for each add-in, the previous analysis and registration including:

an act of identifying the operational capabilities of the add-in, the operational capabilities including one or more of isolation boundaries needed or supported by the add-in and security settings corresponding to the add-in; and an act of inserting one or more properties representing the operational capabilities of the add-in into the entry for the add-in in the component index, the one or more properties including indicating one or more of isolation boundaries needed or supported by the add-in and security settings corresponding to the add-in determined by the analysis;

an act of receiving one or more entries from the component index having properties that satisfy the one or more qualification constraints, each of the one or more entries identifying a candidate add-in that can provide the specified implementation of the intended functionality to the application;

an act of sending a component list including the one or entries to the application;

an act of receiving a selection of an entry included in the component list from the application; and an act of requesting activation of the add-in corresponding to the selected entry so that the application can use the specified implementation of the intended functionality provided by the add-in.

9. The method as recited in claim 8, wherein the act of identifying the operational capabilities of the add-in comprises an act of identifying an entry point protocol for the add-in.

10. The method as recited in claim 8, wherein the act of identifying the operational capabilities of the add-in comprises an act of identifying the permissions associated with the add-in.

11. The method as recited in claim 8, wherein the act of identifying the operational capabilities of the add-in comprises an act of identifying an application domain the add-in can run in.

12. The method as recited in claim 8, further comprising:

in response to the request to activate the add-in, an act of receiving a request from the add-in that the application satisfy one or more other qualification constraints, each other qualification constraint representing functionality that is to be associated with the application for the application to appropriately operate with the add-in component;

an act of comparing the one or more other qualification constraints to properties of the application; and an act of determining if the application is qualified for use with the candidate add-in component based on the results of comparing the one or more other qualification constraints to the properties of the application.

13. The method as recited in claim 8, further comprising an act of sorting add-in component entries of the component index based on a subset of add-in component properties used for add-in discovery.

14. The computer program product as recited in claim 13, wherein the add-in component index is stored in a data repository selected from among a system registry, a shared SQL server, an XML file, an Active Directory server, the Internet and a file system directory.

15. A system, the system comprising:

one or more processors;

system memory; and one or more computer storage media having stored there one computer-executable instructions representing an application, an add-in manager, and one or more add-ins, wherein the application is configured to:

request the loading of an add-in to access functionality provided by the add-in, wherein the request indicates a specified type of add-in providing intended functionality and indicates that the specified type of add-in provides a specified implementation of the intended functionality, the request including one or more properties representing the specified type of add-in and one or more qualification constraints representing the specified implementation of the specified functionality;

receive an indication that an add-in that provides the specified implementation of the intended functionality has been loaded for use by the application; and wherein the add-in manager is configured to:

receive a request to load an add-in, the request indicating a specified type of add-in providing intended functionality and indicating that the add-in is to provide a specified implementation of the intended functionality, the request including one or more properties representing the specified type of add-in and one or more qualification constraints representing the specified implementation of the specified functionality;

perform a coarse grain selection to select any add-ins of the specified type that provide the intended functionality, the coarse grain selection including:

comparing the one or more properties to the contents of component entries in a component list, each component entry in the component list containing add-in properties indicating the type of the add-in, the functionality provided by the add-in, and implementations of the functionality the add-in can provide; and identifying one or more add-ins of the specified type that provide the intended functionality;

perform a fine grain selection of the indentified one or more add-ins to select an add-in that can provide the specified implementation of the intended functionality, the fine grain selection including for each of the one or more add-ins:

comparing the one or more qualification constraints to the one or more properties contained in the component entry for the add-in; and determining if the add-in can provide the specified implementation of the intended functionality based on the comparison; and load the add-in of the specified type that provides the specified implementation of the intended functionality for use by the application.

* * * * *